United States Patent [19]

Deserno

[11] 4,221,981
[45] Sep. 9, 1980

[54] DEVICE FOR FREQUENCY CONVERSION OF COHERENT LIGHT

[75] Inventor: Ulrich Deserno, Munich, Fed. Rep. of Germany

[73] Assignee: Siemens Aktiengesellschaft, Berlin & Munich, Fed. Rep. of Germany

[21] Appl. No.: 970,796

[22] Filed: Dec. 18, 1978

[30] Foreign Application Priority Data

Dec. 30, 1977 [DE] Fed. Rep. of Germany ....... 2758876

[51] Int. Cl.$^2$ .............................................. H03F 7/00
[52] U.S. Cl. .................................................. 307/425
[58] Field of Search ................................ 307/424–430

[56] References Cited

PUBLICATIONS

Shen, "Reviews of Modern Physics", vol. 48, No. 1, Jan. 1976, pp. 1–32.
Midwinter et al., "British J. Applied Physics", vol. 16, 1965, pp. 1135–1141.
Hobden, "J. Applied Physics", Oct. 1967, pp. 4365–4371.
Bloembergen, "Nonlinear Optics", 1965, New York.

Primary Examiner—Rudolph V. Rolinec
Assistant Examiner—Darwin R. Hostetter
Attorney, Agent, or Firm—Hill, Van Santen, Steadman, Chiara & Simpson

[57] ABSTRACT

A device for converting the frequency of coherent light from a prescribed wavelength range characterized by utilizing at least one crystal consisting of a nonlinear optical material. In order to obtain phase adjustment or phase matching, the device of the present invention provides a crystal possessing a property, which, at least for a specific wavelength of $\lambda_u$ from a wavelength range, the phase adjustment angle $\theta_0$ and the phase adjustment temperature of $T_0$ do not depend upon the wavelength at least in the first approximation. Thus, known methods of phase adjustments such as continuously rotating the crystal and/or changing the temperature are not required to adjust the phase when the frequency of the wavelength is changed within certain limits.

2 Claims, 4 Drawing Figures

DEVICE FOR FREQUENCY CONVERSION OF COHERENT LIGHT

BACKGROUND OF THE INVENTION

1. Field of the Invention

The present invention is directed to a device for the frequency conversion of coherent light from a prescribed wavelength range and utilizes at least a crystal consisting of a nonlinear optical material.

2. Prior Art

It is known that the frequency of coherent light sources can be altered with the aid of a polar, dielectric crystal. These are effects of the so-called nonlinear optics. As is known, the polarization P is a function of the electrical field intensity E in accordance with equation:

$$P = \chi(E) \tag{1}$$

wherein $\chi$ is called a "dielectric susceptibility". Equation (1) is provided by the respective materials and thus represents a material equation. Insofar as it deals with a nonlinear relation between the polarization P and the electrical field intensity E, this equation describes, together with the Maxwell equations, processes of nonlinear optics. Distinctly, this equation means that the electrical field intensity in the material, such as the crystal, effects the displacement or shifting of charges, electrons or ions and thereby causes a polarization. In a nonlinear case, this displacement of charges, i.e. the polarization, is not proportional with the electrical field intensity.

The effects of nonlinear optics are described in the following publications: N. Bloembergen, *Nonlinear Optics*, 1965, New York and an article by Y. R. Shen, "Recent Advavces In Nonlinear Optics", *Review of Modern Physics*, Vol. 48, No. 1, January 1976, pp. 1–32.

An important process, which uses the nonlinear optics, is the production of harmonic frequencies and the production of sum and differential frequencies. For example, a process of frequency doubling is known. An example is a primary beam strikes or impinges on a crystal having a nonlinear property and, among other things, a secondary beam is produced, which secondary beam has double the frequency relative to the frequency of the primary beam. During the process of producing the sum or the differential frequencies, two primary beams having different frequencies are directed upon a crystal, among other things, a secondary beam, whose frequency corresponds with the sum or the differences of the frequencies of the two primary beams, is formed.

The efficiency and thus the practical usefullness of the above mentioned processes depends primarily upon the phase difference between the primary beams and the secondary beam, for example, upon the phase difference between the producing and the produced light waves. For electro-dynamic reasons, an energy transmission only proceeds in the desired direction when the equation for the phase difference $\Delta\phi$ is $$-\pi \leq \Delta\phi \leq +\pi \tag{2}$$

The energy transmission is maximum when the equation is:

$$\Delta\phi = 0 \tag{3}$$

The phase relationship of a light wave in the crystal is determined by its initial phase, its vacuum wavelength and the respectively determining index of refraction or refractive index n in the crystal. As this refractive index is normally dispersive, for example this refractive index is a function of the light wavelength, the phase difference between two waves involved in an process of optical frequency conversion generally does not disappear. Only optical anisotropy, that is the additional dependency of the refractive index upon the direction and the polarization of the irradiated light wave relative to the dielectric main axes x, y, z of the crystal being utilized, acts in some cases to compensate for the influence of the dispersion and to thus obtain a phase adjustment. The term "phase adjustment" is understood to mean that the phase difference $\Delta\phi$ to adjust to the condition set forth in equation (2) and preferably satisfies the ideal case which is set forth in equation (3). How phase adjustment for various crystal types can be produced is described, for example, in the following two publications: J. E. Midwinter and J. Warner, *Brit. J. Appl. Phys.*, 16 (1965), p. 1135 and M. V. Hobden, *J. of Appl. Phys.*, 38 (1967), p. 4365.

It is essential for the understanding of the present invention that the actual refractive index n of a lightwave travelling in a given direction with respect to the principal coordinate system x, y, z of the crystall being used as a nonlinear material is a function of the main refractive indices $n_x$, $n_y$, $n_z$ (See J. F. Nye, "Phys. Prop of crystals", Clarendon 1972, p. 236) The main refractive indices are again functions of the wavelength $\lambda$, and of the temperature T.

Thus the phase difference between two waves travelling in a nonlinear crystal is a function of the direction of the existing wave normals, the wavelengths and the temperature of the crystal.

In the simplest case, that is collinear second harmonic generation in an uniaxial crystal all light rays have the same direction, and moreover, phase matching, if it exists, may be achieved by adjusting only one single critical direction coordinate $\theta$ exists, so that the phase adjustment is provided then as the primary wave or beam impinges in this angle relative to the optical axes of the crystal. For biaxial crystals in general two critical direction coordinates exist, and the primary beam must impinge at the first critical angle relative to the first axis and must impinge in a second critical angle relative to the second axis.

It must also be taken in consideration that for reasons of energy preservation, the wavelength of the primary beam and of the secondary beam are dependent upon one another, and for a prescribed nonlinear process generally only one independent wavelength variable $\lambda_1$, for example the wavelength of the primary beam, exist. Insofar as an angle of $\theta_0$ even exists, by means of which an optical phase adjustment according to the equation (3) can be obtained, this angle is a function f of the characteristics wavelength $\lambda_1$ and of the crystal temperature T. This can be symbolically written by the following formula:

$$\theta_0 = f(\lambda_1, T) \tag{4}$$

In the case of the process of collinear frequency doubling, this equation means the following. For a phase adjustment according to equation (3), it is necessary that the primary beam or the secondary beam propagate at a specific angle $\theta_0$ relative to a specific main axis of the crystal. This angle, the phase watching angle is dependent upon the frequency of either the primary beam or the secondary beam and upon the crystal temperature.

The following difficulties can be concluded from equation (4). If the primary beam is a frequency modulated beam, the phase adjustment angle $\theta_0$ alters its value with the frequency modulation since $\lambda_1$, in this case, is not a constant. To correct for this problem, the crystal must be continually rotated in its direction or must be brought to a different temperature. If, for example, the temperature is being changed to correct for the changes in the phase adjustment angle, the time periods involved with changing temperature are typically in the order of 10–100 seconds. If the phase adjustment is adjusted by means of turning or rotating the crystal, the time periods depending on the crystal magnitude are in the order of 0.1–1 second. In addition to the problems which include the technical expense for the synchronous tuning of the phase adjustment, the frequency change or the speed of the optical frequency modulation is severly limited by these forms or types of processes for correcting for changes in the frequency of the primary or secondary beam.

SUMMARY OF THE INVENTION

It is therefore an object of the present invention to provide a device for frequency conversion of coherent light that utilizes a nonlinear optical crystal which crystal has means for eliminating or minimizing problems with regard to changes of the phase adjustment angle due to changes in the frequency of the light being utilized.

To accomplish these objects, the present invention is directed to the device for frequency conversion of coherent light from a prescribed wavelength range which utilizes at least one crystal consisting of a nonlinear optical material with the improvement comprising the crystal possesses the property that at least for a specific wavelength of $\lambda_u$ from a wavelength range, the phase adjustment angle of $\theta_0$ and the phase adjustment temperature $T_0$ do not depend upon the wavelength at least in the first approximation. Mathematically, this property is expressed for $\lambda_u$ at least in accordance with the following equation:

$$d\theta_0/d\lambda_1 = 0 \quad (5)$$

and/or $$dT_0/d\lambda_1 = 0 \quad (6)$$

By this condition, it is the specific range or region $\lambda_- < \lambda_\mu < \lambda_+$ where the phase condition $|\Delta\phi| \leq \pi$ for a constant $T_0$ and $\theta_0$ is fulfilled. In this range of wavelengths, an arbitrary rapid frequency alterations of the waves, which are used in the process, are possible without impairing the energy transmission to the secondary light waves. It is particularly advantageous if $\theta_0$ and/or $T_0$ not only do not depend upon the wavelength for the first approximation but also have higher derivations which are not dependent on the wavelength.

The more the derivations disappear, the wider the achromatism range is and thus the possible frequency shift or change of the light wavelength.

A crystal is particularly advantageous in which, for the direction of $\theta_0$, not only the phase difference $\Delta\phi$ but also its first derivation d $(\Delta\phi)/d\theta$ disappears. Thereby the condition $|\Delta\phi| \leq \pi$ can be fulfilled over a large traverse of the beam. Thus, in this case, diverging light beams, i.e. light bundles, can also be processed in which the partial beams of the bundle impinge upon the crystal under various angles. This crystal material would ideally be suited for the frequency transformation of tunable dye lasers, and semiconductor lasers since with a great frequency change, it can simultaneously process a generally larger divergence of these light sources.

DESCRIPTION OF THE DRAWINGS

FIG. 1A shows a typical curve of $\theta_0$, FIG. 1B shows the curve of $\theta_0$ in the inventive achromatic phase adjustment, and FIG. 1C shows the curve of $\theta$ in an inventive achromatic and a phase adjustment noncritical as to direction.

DESCRIPTION OF THE PREFERRED EMBODIMENT

The principles of the present invention are particularly useful for providing a nonlinear optical crystal with means so that problems with changing the phase adjustment angle and/or the temperature because of frequency modulation of the light beam being directed on the device are eliminated or minimized.

Figure 1A:
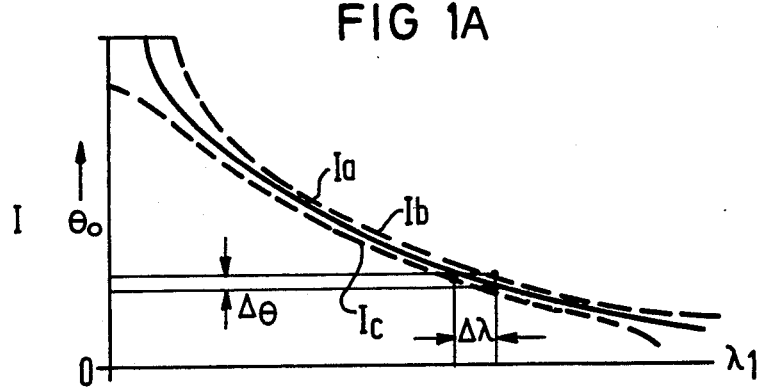
FIGS. 1A, 1B and 1C illustrate three graphs showing the dependency of the phase angle upon the wavelength $\lambda_1$ in an optical frequency transformation process. In particular.

In the graph of FIG. 1A, the dependency of the phase adjustment angle $\theta_0$ upon the changes of the wavelength $\lambda_1$ is illustrated in an optical frequency transformation and shows the monotonous curve normally occurring for such crystal materials. The continuous line curve Ia shows the relationship for a phase difference of $\Delta\phi = 0$, which is a complete phase adjustment. The broken or dash line curve Ib is for $\Delta\phi = +\pi$ and the broken line curve Ic is for $\Delta\phi = -\pi$. The distance or spacing of these curves determines the acceptance angle $\Delta\theta$ and the achromatism range of $\Delta\lambda$ for a given crystal length.

Figure 1B:
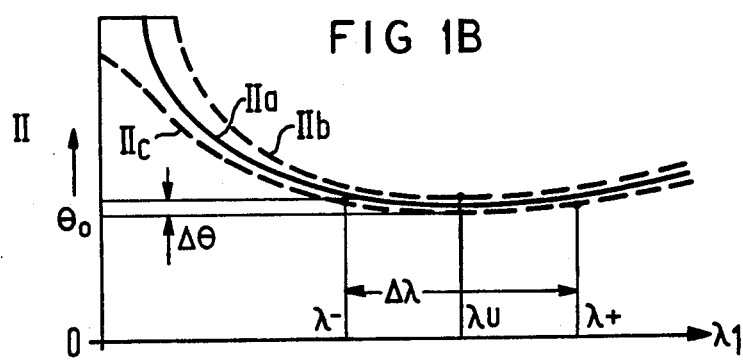

In FIG. 1B, the curves for the adjustment angle $\theta_0$ relative to $\lambda_1$ for a crystal material which exhibits a minimum that is generally an extremum with $\lambda_u$ are illustrated. The continuous curve IIa again is for $\Delta\phi = 0$, curve IIb is for $\Delta\phi = +\pi$ and curve IIc is for $\Delta\phi = -\pi$. As in the graph of FIG. 1A, the acceptance angle is plotted as $\Delta\theta$ and the achromatism range is the distance $\Delta\lambda$ with the two limits being $\lambda_-$ and $\lambda_+$.

Figure 1C:
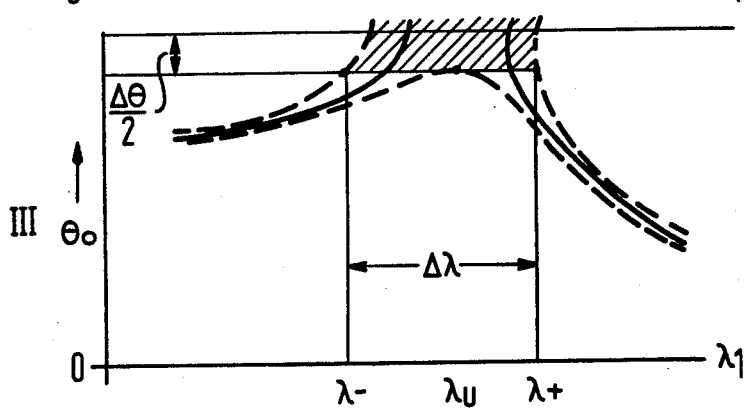

In FIG. 1C, the curves of the adjustment angle $\theta_0$ relative the wavelength $\lambda_1$ of a crystal material for achromatic and noncritical direction phase adjustments are illustrated. Here also, $\Delta\phi = 0$ is illustrated by the continuous curve and $\Delta\phi = \pm\pi$ is shown by the two broken line curves.

An achromatic phase adjustment for a given input and output wavelength can be obtained either by means of selecting a material, which is nonlinear in regard to the required dispersion and anisotropic properties, by crystallurgical modification of these properties, or by modifications of the frequency conversion process. Regarding the latter, it is imaginable, for example, that in a material for which $d\theta_0/d\lambda$ does not disappear for the collinear mixing of two waves with a given frequency at equal polarization, that a phase adjustment occurred with a non-colinear mixing and/or utilization of orthogonally polarized waves.

Figure 2:
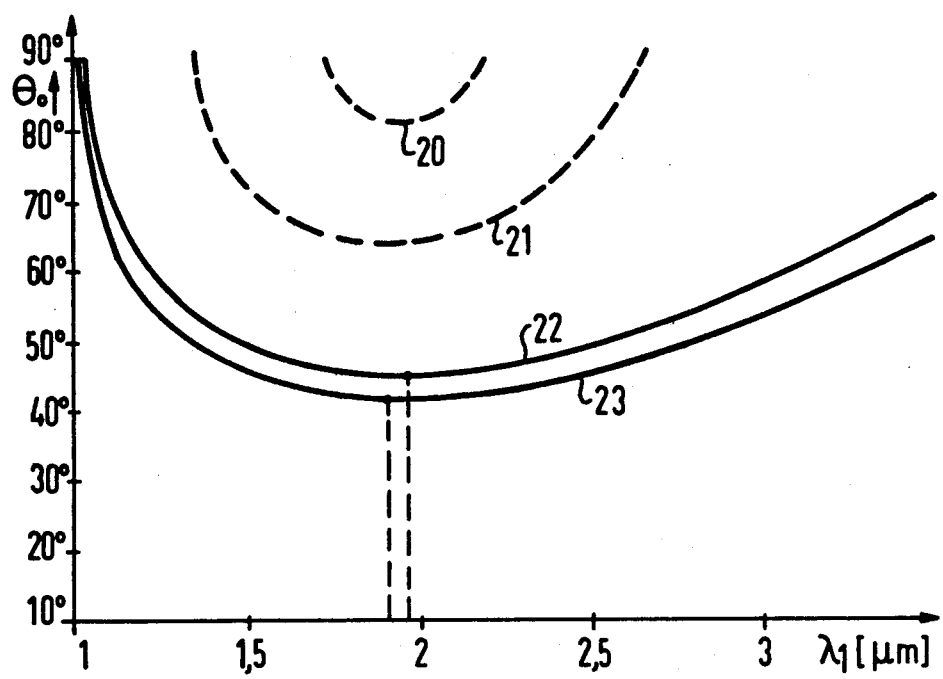
FIG. 2 shows in graphic form the curves of the dependency of $\theta_0$ on the wavelength $\lambda_1$ for different crystal materials used in accordance with the present invention.

In FIG. 2, the respective curves of adjustment angle $\theta_0$ versus $\lambda_1$ are plotted for various crystal materials suitable for an achromatic phase adjustment. Curve 20 is for LiGaO$_2$, Type II. Curve 21 is for LiNbO$_3$, Type II. Curve 22 is for LiGaO$_2$, Type I; and curve 23 is for LiNbO$_3$, Type I. For the curves 20 and 22, the $\lambda_u$ lies at 1.95 μm and for the other curves, $\lambda_u$ is approximately 1.90 μm. The designations type I and type II phase watching refer to the polarizations of the lightwaves and are in accordance with the paper by Midwinter and Warner as mentioned above.

As is found out, the extrema of $\theta_0(\lambda)$ are not uncommon for the production of the second harmonic, the extrema which fulfills the condition of $\lambda_1$ and $\lambda_2 = \lambda_1/2$ lying in the optical transmission range. Minimas, for example, are present for the known substances KDP and LiNbO$_3$ (see FIG. 2), LiGaO$_2$ (also see FIG. 2), AgGaSe$_2$, AgGaS$_2$, Ba(NO$_2$)$_2$·H$_2$O. The coordinates and the minimas are set forth in the following table, wherein n$_1$ represents the ordinary refractive index and n$_2$ the extraordinary refractive index. Additionally, for some substances, the angular deflection of $\theta_0$ is provided in angle minutes for a crystal of 1 cm length for the permissible phase mistuning of $\pm\pi$. Additionally, aluminum phosphate (AlPO$_4$) is illustrated as a suitable crystal substance.

| Substance | Symmetry | λ μm | $\theta_0$ Degrees | n$_1$ at λδ | n$_2$ at λδ | Δθ(θ$_0$) Minutes |
|---|---|---|---|---|---|---|
| LiGaO$_2$ | mm2 | 1.95 | 44.81 | 1.76653 | 1.74493 | 15.51 |
| LiNbO$_3$ | 3m | 1.9 | 41.77 | 2.2530 | 2.1654 | 3.51 |
| Ba(NO$_2$)$_2$·H$_2$O | 6mm | 1.7 | 22.664 | 1.60154 | 1.51024 | 4.5 |
| AlPO$_4$ | 32 | 1.4 | (90°, Coherence length = 0.21673 mm) | | | |
| AgGaSe$_2$ | 42m | 3 | (39° Type I, 66° Typ II) | | | |
| AgGaS$_2$ | 42m | 2.2 | (30° Typ I, 46° Typ II | | | |
| KDP | | 1 | 41.2 | 1.51218 | 1.47045 | 4.15 |

Although various minor modifications may be suggested by those versed in the art, it should be understood that I wish to embody within the scope of the patent warranted hereon, all such modifications as reasonably and properly come within the scope of my contribution to the art.

I claim:

1. In a device for frequency conversion of a coherent light from a prescribed wavelength range, said device including at least one crystal consisting of a nonlinear optical material the improvements comprising each crystal for a specific wavelength $\lambda_u$ for a wavelength range having properties of the phase matching angle $\theta_0$ and the phase matching temperature of T$_0$ being independent of the wavelength at least in the first approximation.

2. In a device according to claim 1, wherein the crystal has the property that the first derivation of d $(\Delta\phi)/d\theta$ disappears for a direction of $\theta_0$.

* * * * *